United States Patent [19]

Tervoert et al.

[11] Patent Number: 5,124,699
[45] Date of Patent: Jun. 23, 1992

[54] ELECTROMAGNETIC IDENTIFICATION SYSTEM FOR IDENTIFYING A PLURALITY OF CODED RESPONDERS SIMULTANEOUSLY PRESENT IN AN INTERROGATION FIELD

[75] Inventors: Marius L. Tervoert, Borculo; Willem H. J. Venema; Arjan H. Scholten, both of Enschede; Jan C. Stekelenburg, Varsseveld, all of Netherlands

[73] Assignee: N.V. Netherlandsche Apparatenfabriek Nedap, De Groenlo, Netherlands

[21] Appl. No.: 545,944

[22] Filed: Jul. 2, 1990

[30] Foreign Application Priority Data

Jun. 30, 1989 [NL] Netherlands .................. 8901659

[51] Int. Cl.$^5$ .............................................. H04B 7/00
[52] U.S. Cl. ................................ 340/825.54; 340/572; 342/44
[58] Field of Search ................ 340/825.31, 825.34, 340/825.54, 572, 870.03; 342/44, 51; 128/903

[56] References Cited

U.S. PATENT DOCUMENTS

| | | | |
|---|---|---|---|
| 4,459,474 | 7/1984 | Walton | 340/825.31 |
| 4,471,345 | 9/1984 | Barrett, Jr. | 340/572 |
| 4,614,945 | 9/1986 | Brunius et al. | 340/870.03 |
| 4,691,202 | 9/1987 | Denne et al. | 340/825.54 |
| 4,799,059 | 1/1989 | Grindahl et al. | 340/870.03 |
| 4,862,160 | 8/1989 | Ekchian et al. | 340/825.54 |

FOREIGN PATENT DOCUMENTS 0285419 10/1988 European Pat. Off. .

Primary Examiner—Donald J. Yusko
Assistant Examiner—Dervis Magistre
Attorney, Agent, or Firm—Fleit, Jacobson, Cohn, Price, Holman & Stern

[57] ABSTRACT

An electromagnetic detection and identification system for detecting and identifying a plurality of responders (improved transponders), each containing a unique code, and simultaneously present in one and the same interrogation field generated by a transmitter/receiver. According to the invention, the transmitter/receiver is arranged to adjust the frequency of the interrogation field periodically to one of a predetermined number of predetermined values, and each responder is arranged to detect the instantaneous frequency of the interrogation field, the arrangement being such that, in a number of selection cycles, each time a number of responders temporarily deactivate themselves in dependence upon the instantaneous frequency until one single responder remains which an generate the appurtenant code without becoming deactivated until the responder has been identified by the transmitter/receiver, whereafter the responder concerned is blocked by a change in field frequency, and the temporarily deactivated responders are reactivated, and the selection procedure is repeated until all responders in the interrogation field have been identified and blocked.

12 Claims, 2 Drawing Sheets

ELECTROMAGNETIC IDENTIFICATION SYSTEM FOR IDENTIFYING A PLURALITY OF CODED RESPONDERS SIMULTANEOUSLY PRESENT IN AN INTERROGATION FIELD

FIELD OF THE INVENTION

This invention relates to an electromagnetic detection and identification system for detecting and identifying a plurality of responders, each containing a unique code, and simultaneously present in one and the same interrogation field generated by a transmitter/receiver.

BACKGROUND

Electromagnetic detection/identification systems for human beings, animals and goods are at present used for countless applications. Such systems are used, inter alia, for permitting authorized persons access to, for example, protected premises. In such a system, one or more transmitters/receivers are disposed at the entrances and exits of a building, which are capable of recognizing a detection label or responder in the interrogation field. Thereafter the system can verify whether the person carrying the responder is authorized to enter or even leave the building or part of a building at that time Electromagnetic detection systems are also used for the identification of articles. The recognition of articles may be of interest for the control of logistic processes in industrial enterprises. For example, these systems are used in the automobile industry for recognizing containers with specific parts and guiding these to the desired production site These detection and identification systems can be so arranged that the responders do not require a power source of their own, but on the contrary, obtain their supply voltage from the interrogation field.

The major disadvantage of presently known systems is that correct identification is only possible if only one responder is present in the interrogation field. If two or more responders are present in the interrogation field, the unique codes generated by the responders are distorted, as a result of which the validation of the distorted codes leads to error detection in the transmitter/receiver. The result is that none of the responders can be detected. The condition that only one single responder may be present in the interrogation field presents problems for a considerable number of applications of detection systems, which necessitate adaptations which ensure that only one responder is present in the interrogation field at any time.

A method of identifying a plurality of responders in one interrogation field is disclosed in European patent application 0285419 and in applicant's Netherlands patent application 88,02718. That method involves an algorithmic selection procedure which uses a signal sent along with the interrogation carrier, which signal causes only one or a group of the responders that are to be identified to answer back with their code(s), and temporarily deactivates the other responders. In this arrangement, a strict sequence is applied for the identification. The disadvantage of this principle is that the operation is highly complex, so that the responder circuit is in practice relatively large, which has an adverse effect on current consumption Furthermore, identifying responders one by one requires a great deal of communication between the transmitter/receiver and the responders. Moreover, this makes the cycle for the identification of the various responders relatively long.

SUMMARY OF THE INVENTION

It is an object of the present invention to remedy the drawbacks and disadvantages outlined above. More in general it is an object of the present invention to provide an effective and reliable electromagnetic detection-/identification system which is capable of correctly and rapidly identifying a plurality of responders simultaneously present in an interrogation field.

For this purpose, according to the present invention, an electromagnetic identification system of the above kind is characterized in that said transmitter/receiver is arranged to adjust the frequency of the interrogation field periodically to one of a pre-determined number of pre-determined values, and each responder is arranged to detect the instantaneous frequency of the interrogation field, the arrangement being such that, in a number of selection cycles, each time a number of responders temporarily deactivate themselves in dependence upon the instantaneous frequency until one single responder remains which can generate the appurtenant code without becoming deactivated until the responder has been identified by the transmitter/receiver, whereafter the responder concerned is blocked by a change in field frequency, and the temporarily deactivated responders are reactivated, and the selection procedure is repeated until all responders in the interrogation field have been identified and blocked

BRIEF DESCRIPTION OF THE DRAWINGS

The invention will now be described in more detail hereinafter with reference to the accompanying drawings In said drawings.

DESCRIPTION OF THE PREFERRED EMBODIMENT

Figure 1:
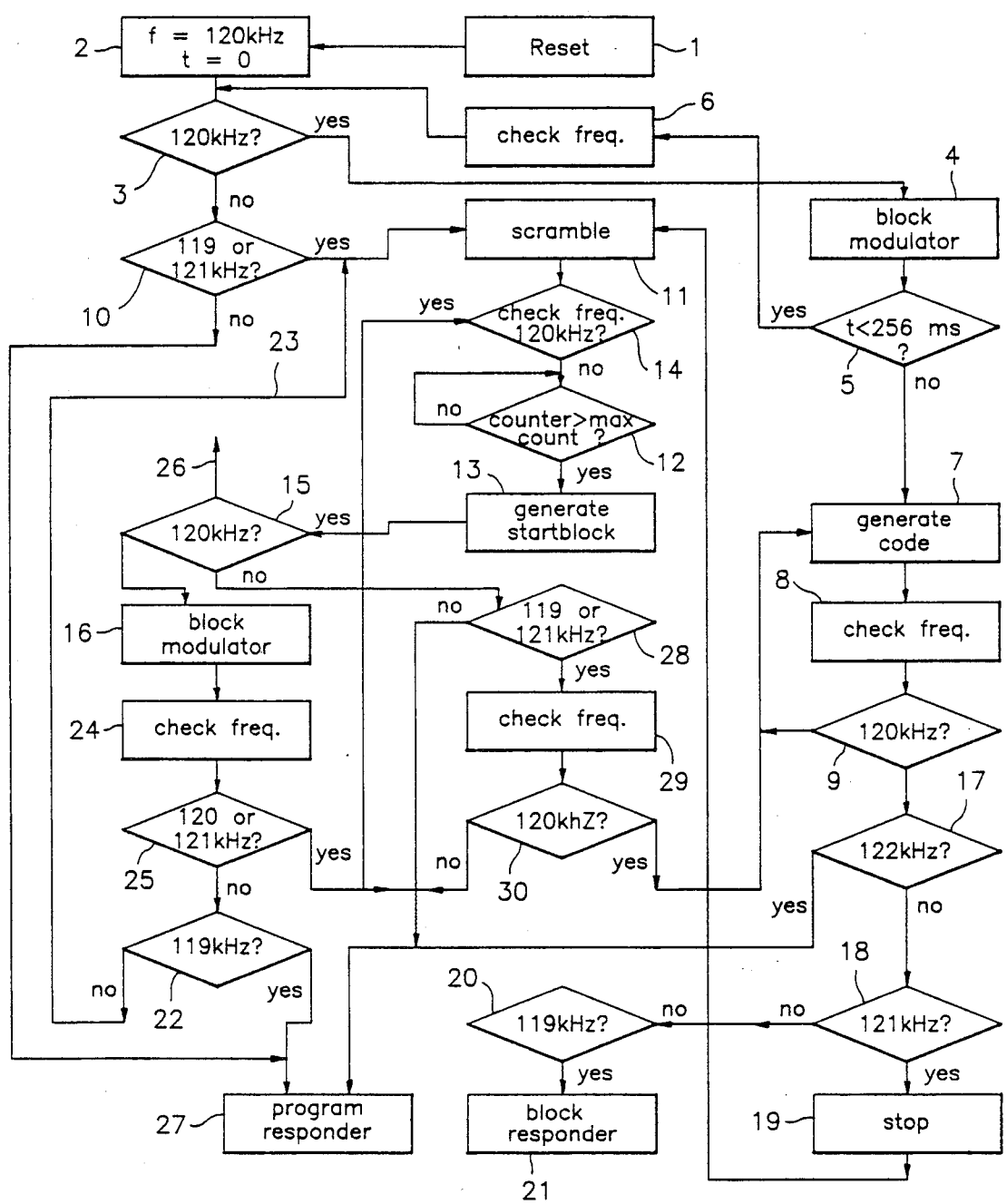
FIG. 1 shows schematically, by means of a flow chart, the operation of one embodiment of an identification system according to the present invention.

Referring first to FIG. 1, when a responder is introduced into an interrogation field, it will bring itself into a starting position owing to the generation of supply voltage from the interrogation field itself. The way in which a responder can take supply energy from an interrogation field is described, for example, in U.S. Pat. No. 4,196,418, which is incorporated herein by reference. The circuit in the responder is in that case reset (block 1). The responder will then test for a pre-determined period of time, e.g. 256 ms, whether the frequency of the interrogation field is varied in this period (blocks 2-6). In the description of this invention it will be assumed, for the sake of simplicity and by way of example, that the frequency of the interrogation field may be 119, 120 or 121 kHz. Accordingly, the frequency will vary between these values. When the frequency continuously maintains a first value, e.g. 120 kHz, within the period of 256 ms, it is then assumed that the responder is present in the field of an electromagnetic detection system which does not operate in accordance with the present invention. After this period, the responder will be able to function as a responder as described in U.S. Pat. No. 4,196,418, and will therefore start to modulate the interrogation field in a manner corresponding with the code of the responder, until the responder is removed from the field (block 7). In this situation, the responder is continuously switched in the active mode. However, the responder also continues to measure the frequency of the interrogation field (blocks 8,9). When the frequency changes, the active mode of the responder will yet be interrupted, in a manner to be described hereinafter, and the responder will then begin to participate in a selection procedure until recognition has taken place.

If, on the other hand, the responder has detected a variation of the frequency of the interrogation field within the period of 256 ms, e.g., from 120 kHz to 119 kHz or to 121 kHz (block 10) a selection procedure is started at once.

The selection procedure starts with the so-called scrambling (block 11) of all responders then present within the interrogation field. This is achieved by virtue of each responder being provided with a random number ranging between two values, e.g. 0 and 127, by means of a pseudo-random generator, built up, for example, around a shift register This number serves as a starting value for a counter. Preferably, this is a counter already incorporated in the responder for the formation of the code. If desired, the random number can be formed by the pseudo-random generator in cooperation with the unique code of the relevant responder. Subsequently, the counter begins to count further from the random number. Furthermore, the random number may either be generated again each time, or be a pre-determined, fixed number for each responder. When each responder has its own pseudo-random generator, the generator may be built up, for example, from a shift register which, for the calculation of the random number ranging, for example, between 0 and 127, is each time loaded with a number of bits obtained by continually comparing a varying part of the code with the bits then present in the shift register. Thereafter the bits in the shift register are shifted by one position, so that after a cycle a random number in binary form is again available. The responder whose counter first reaches the transition from value 127 to value 0 (block 12) is capable of transmitting a so-called starting block. This starting block may, for example, be a load on the interrogation field which is equal to the load caused by a binary number of eight bits each having the value zero. In the mean time, the frequency is also controlled (block 14). When the transmitter/receiver has recognized the starting block, the field frequency of 119 or 121 kHz initially detected by the responder is again changed into a frequency of 120 kHz. All responders which detect the change in frequency (block 15), and whose counters have not yet reached the transition from value 127 to value 0 are switched into a passive mode (block 16) by the frequency change. The greater part of the responders present in the interrogation field are thus temporarily left out of account for the identification. The other responders, i.e., whose counters have passed the final position of 127, will be going to generate their unique code in known manner by modulating the interrogation field. If more than one responder transmit a code in this manner, the receiver will report an error. This can be effected, for example, by changing the field frequency from 120 kHz to 121 kHz. For these responders this is the indication that a selection procedure must again be followed The selection procedure is repeated in this way until finally one responder remains This responder is enabled to transmit its unique code completely by rhythmically loading the interrogation field (arrow 26) During this time, all other responders wait in the passive mode (block 16) until the selected responder has been identified. As soon as the selected responder has been recognized, the transmitter again changes its frequency, for example, to 119 kHz. When the responder selected and identified detects the new frequency, it is switched into a passive mode, i.e., it is excluded from participation in any subsequent selection procedure (blocks 20,21). This passive mode can only be changed when the circuit in the responder is reset, as is the case, for example, when the responder has first been removed from, and then reintroduced into, the interrogation field. For the responders which are in the passive mode, the change in interrogation field frequency from 120 to 119 kHz is an indication to reparticipate into the selection procedure according to the invention (block 22, arrow 23). As in the preceding selection procedure, one, but then a different, responder will remain. These cycles will be repeated until the last responder has been recognized. An important feature is that, in each cycle, a relatively high percentage of responders is excluded from selection (blocks 16,24,25. As a result, the time needed for reading the codes of all responders present in the interrogation field is relatively short.

For the purposes of the present invention, the detection system should be so arranged that there can be data transmission between the transmitter/receiver and responder as well as from the responder to the transmitter/receiver. With regard to the transmission of data from responder to transmitter/receiver, the invention is based on the well-known principle that the responder obtains supply voltage for the responder circuits from the interrogation field, and that the interrogation field is also used for the transmission of data between responder and transmitter/receiver. Naturally, each responder may have its own power source in this system, for example, in the form of a battery. Moreover, it is not necessary for the data transmission from responder to transmitter/receiver to be effected through the interrogation field. For example, each responder may be equiped with a transmission device which uses a different frequency for the transmission of data from the frequency of the interrogation field of the transmitter/receiver.

If desired, the responder circuit may include a programming mode in addition to a reading mode. When, by means of the selection according to the invention, for example, one responder remains, such responder may be switched into a programming mode by a pre-determined variation of the frequency of the interrogation field. This could be effected, for example, by adjusting the field frequency to 122 kHz (block 17). Thereafter the appropriate data in the memory can be changed (block 27), and the programming mode can again be left by changing the frequency.

Figure 2:
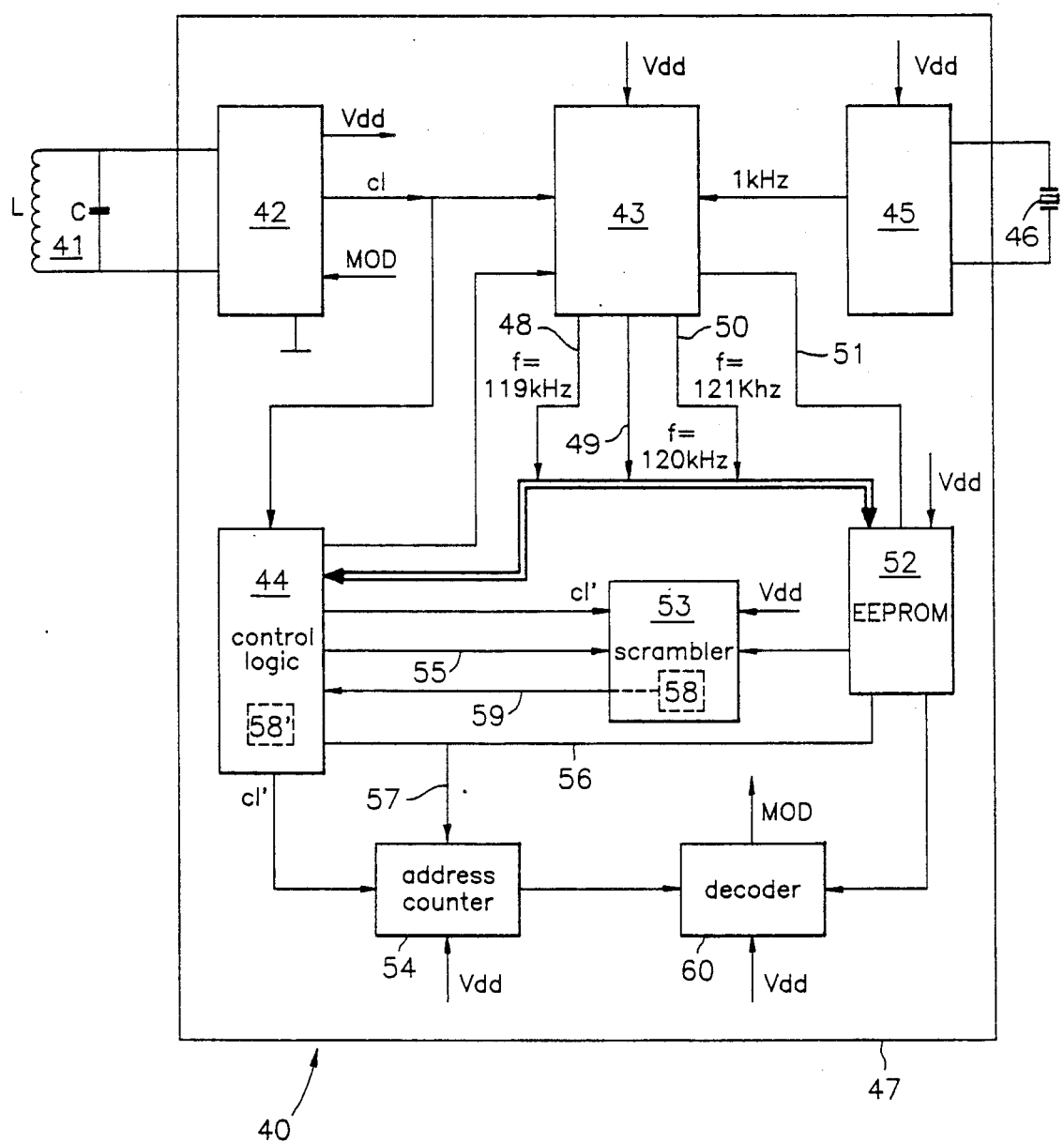
FIG. 2 shows schematically one embodiment of a responder for a system according to the present invention.

FIG. 2 shows schematically an example of a responder 40 suitable for use in an electromagnetic identification system according to the present invention. As shown, the responder comprises a resonant circuit 41 with a coil L and a capacitor C. The resonant circuit is connected to a block 42 which in known manner, for example as described in U.S. Pat. No. 4,196,418, provides supply voltage Vdd and clock signals CL, and which further comprises a switching means for varying the electrical properties of the resonant circuit in accordance with the code of the relevant responder. The clock signals are derived from the A.C. voltage generated across the resonant circuit by the interrogation field, and consequently form a measure for the frequency of the interrogation field. The clock signals are supplied to a frequency counter 43 and to the control logic 44 of the responder. The frequency counter is connected to a crystal oscillator 45 with a crystal 46, serving as a reference.

As indicated by a frame 47, the responder circuit may take the form of an integrated circuit, to which the crystal and the LC circuit require to be connected as the only external elements The frequency counter 43 has various outputs 48,49,50,51, which each correspond to one of the field frequencies to be measured. Thus output 48 provides a signal if a field frequency of 119 kHz has been detected; output 49 if a field frequency of 120 kHz has been detected, etc. These signals are supplied to the control logic 44 and to a memory 52, comprising the code, which for example may be an EEPROM.

The control logic transmits clock pulses CL' to scrambler 53 and an address counter 54. These may be the same clock pulses as supplied by block 42 to the control logic, or pulses derived therefrom. The control logic further transmits control signals to scrambler 53, memory 52 and address counter 54, as indicated by lines 55,56 and 57. As soon as the counter coupled to scrambler 53, which may form part of the scrambler, as indicated at 58, or of the control logic, as indicated in dash lines at 58', passes the final position 127, the control logic effects, for example as indicated through address counter 54, memory 52 and decoder 60, that the starting block is transmitted. For this purpose, the scrambler is connected to the control logic. If desired, the address counter may serve also as the counter for the scrambler. The decoder has an output MOD, which is connected to the switching means in block 42.

Accordingly, the only purpose of the scrambler is to provide a randomly chosen waiting period for each responder before it can transmit a starting block As soon as the first responder has transmitted a starting block, all other responders whose counters have not yet passed the final position are switched into a passive mode. This is possible because of the transmitter/receiver responding to the correct reception of a starting block by changing the field frequency, for example, to 120 kHz.

A change of the field frequency is detected through the frequency counter by the control logic, which subsequently generates the appropriate control signals Upon a change in field frequency from 119 kHz or 121 kHz to 120 kHz, the control logic blocks, for example, through lines 56 and 57 the possibility of transmitting the responder code, except in case the counter 58 or 58' has then already passed the final position Such blocking may alternatively be realized in a different way. Thus, it is possible for the control logic to directly block the switching means in block 42.

If the situation should occur that, after the moment when the field frequency has been adjusted to 120 kHz, two or more responders transmit their code, because their counters 58 or 58' had passed the final position in good time, the transmitter/receiver detects an error, and the field frequency is again changed, e.g. to 121 kHz. Subsequently the responders which simultaneously generate a code signal are involved in a continued selection procedure (blocks 17-19 of FIG. 1).

If, however, the field frequency is not changed to 121 kHz, this means that only one single responder generates a code signal, which can then be fully generated. When the responder thus selected has been identified, the transmitter/receiver again changes the field frequency to, for example, 119 kHz, as described before, and the responders switched to the passive mode in the preceding procedure are involved in a new selection procedure.

As shown, there is a line 51 between the frequency counter 43 and memory 52. Line 51 serves for switching the memory to the programming mode after the associated field frequency (122 kHz) has been detected.

It is observed that, after reading the above, various modifications will readily occur to those skilled in the art. Thus, the frequency values have been mentioned by way of example only. Also, the construction of the responders may vary. This is partly dependent upon the purpose for which the responders are used. These and similar modifications are considered to fall within the scope of the present invention.

We claim:

1. An electromagnetic detection and identification system for detecting and identifying a plurality of responders, each containing a unique code, and simultaneously present in one and the same interrogation field, comprising:

a transmitter/receiver having:

means for generating an interrogation field;

means for receiving the unique code of each responder sequentially on the same frequency to identify each responder; and means for adjusting the frequency of the interrogation field to one of a predetermined number of predetermined values; and a plurality of responders each having:

means to transmit the unique code on the same frequency for all the responders;

means for detecting the instantaneous frequency of the interrogation field;

selection means to repeatedly temporarily deactivate responders from selection until only one single selected responder remains enabled which can transmit an identification code without becoming deactivated until the responder has been identified by the transmitter/receiver said selection means including scrambler means for selecting a random number, a counter which after the detection of a predetermined field frequency begins to count from the random number, and means for generating a starting code, when the responder reaches a predetermined counter position, which results in such a change in frequency of the interrogation field as to temporarily deactivate all responders which have not yet reached said predetermined counter position;

means to block the identified responder by a change in field frequency, means for reactivating the temporarily deactivated responders, and means for repeatedly reactivating the selection means until all responders in the interrogation field have been identified and blocked.

2. An electromagnetic detection and identification system as claimed in claim 1, in which each responder further comprises a pseudo-random number generator for providing a new random number each time said selection means are activated.

3. An electromagnetic detection and identification system as claimed in claim 2, in which the pseudo-random generator for each responder includes, a shift register for periodically loading with a number of bits obtained by comparing each time a different part of the unique code with the bits then present in the shift register, whereafter the bits are shifted by one position in the shift register, so that a new random number in binary form becomes available for the responder each time a cycle is terminated.

4. An electromagnetic detection and identification system as claimed in claim 1 in which each responder further includes a control logic which upon detection of a pre-determined change in field frequency terminates the temporarily deactivated condition.

5. An electromagnetic detection and identification system as claimed in claim 1, further comprising:

means for switching one or more responders into a programming mode upon detection of the frequency detection means of a predetermined frequency of the interrogation field for signalling said programmable mode, so that the responder memory in which the unique code is stored, or a part thereof, can be changed.

6. An electromagnetic detection and identification system as claimed in claim 1, further comprising:

means for bringing responders into a starting position for identification of the responders upon the generation of supply voltage in the responder as a result of the responder being introduced into the interrogation field generated by the transmitter/receiver.

7. An electromagnetic detection and identification system as claimed in any of the preceding claims, further comprising:

a frequency counter means for each responder for providing a different output for each frequency to be detected.

8. An electromagnetic detection and identification system as claimed in claim 7, further comprising, a crystal oscillator coupled with the frequency counter for serving as a frequency reference.

9. A system for automatically identifying a plurality of responders of unknown number by transmission of a unique code for each responder sequentially on the same frequency for all responders, comprising:

selection means for selecting only one of the responders to be identified and for temporarily disabling all the other responders to be identified from transmitting said code at said frequency;

identification means for identifying the selected responder by transmission of said code;

blocking means for blocking the identified responder from further transmission of said code;

reenabling means for reenabling all the temporarily disabled responders to be identified;

means for repeatedly activating the selection, identification, blocking and reenabling means until all the responders are identified.

10. The system of claim 9 in which said selection means for each responder, includes waiting means for selecting an independent waiting period for each responder to be identified within a predetermined range for minimizing the number of responders which simultaneously complete their waiting periods and for minimizing the length of the shortest waiting period selected so as to quickly identify all the responders;

signalling means for signalling the completion of the waiting period of one or more responders which first complete their selected waiting period;

disabling means for temporarily disabling the responders which have not completed their waiting periods;

determining means for determining whether more than one responder completed the waiting periods; and mean for repeatedly activating the waiting, signalling, disabling and determining means depending upon the determination of said determining means until only one responder remains enabled, each time selecting a new waiting period for each enabled responder for minimizing the number of responders which again have the same waiting period.

11. The system of claim 10 in which waiting means for each responder, includes:

scrambling means to select a pseudo-random number within a predetermined range independent of the pseudo-random number selected for any other responder; and counter means to wait depending on the selected pseudo-random number.

12. A method for automatically identifying a plurality of responders of unknown by transmission of a unique code for each responder sequentially on the same frequency for all responders, comprising the steps:

selecting only one of the responders to be identified;

temporarily disabling all the other responders to be identified from transmitting said code at said frequency;

identifying the selected responder by transmission of said code;

blocking the identified responder from further transmission during the identification process;

reenabling all the temporarily disabled responders to be identified; and repeating the selecting temporarily disabling, identifying, blocking, and reenabling steps until all the responders are identified.

* * * * *